United States Patent [19]
Lancaster

[11] Patent Number: 5,451,198
[45] Date of Patent: Sep. 19, 1995

[54] ROLLER WITH REPLACEABLE SLEEVE

[76] Inventor: Joseph L. Lancaster, 10135 Hwy. 92 East, Tampa, Fla. 33610

[21] Appl. No.: 304,569

[22] Filed: Sep. 12, 1994

[51] Int. Cl.$^6$ .................................................. B23P 15/00
[52] U.S. Cl. ........................................ 492/48; 226/191; 492/57
[58] Field of Search ............... 492/1, 47, 48, 49, 57; 226/190, 191, 193

[56] References Cited

U.S. PATENT DOCUMENTS

| | | | |
|---|---|---|---|
| 1,783,868 | 12/1930 | Wenzel | 492/48 |
| 2,793,571 | 5/1957 | Way et al. | 92/53 |
| 3,184,828 | 5/1965 | Dames, Jr. | |
| 3,462,058 | 8/1969 | Redman | 226/191 |
| 3,514,829 | 6/1970 | Blatt | 492/48 |
| 3,537,632 | 11/1970 | Watson | 226/191 |
| 3,601,298 | 8/1971 | Schulze et al. | 226/191 |
| 3,739,675 | 6/1973 | Duckett et al. | 492/48 |
| 3,765,329 | 10/1973 | Kirkpatrick et al. | 492/48 |
| 3,771,206 | 11/1973 | Brown | |
| 3,827,120 | 8/1974 | Mayer | |
| 4,038,731 | 8/1977 | Hill | |
| 4,178,664 | 12/1979 | McLoughlin | |
| 4,193,178 | 3/1980 | McArthur et al. | 492/48 |
| 5,052,090 | 10/1991 | Kitaura et al. | 492/47 |
| 5,151,737 | 9/1992 | Johnson et al. | 492/47 |
| 5,167,055 | 12/1992 | Stoddart et al. | 492/47 |
| 5,169,450 | 12/1992 | Opad et al. | 492/47 |
| 5,182,840 | 2/1993 | Jacobs et al. | 492/47 |

*Primary Examiner*—Irene Cuda
*Attorney, Agent, or Firm*—Pettis & McDonald

[57] ABSTRACT

A roller with a replaceable sleeve used primarily in the can industry to apply a surface coating to the cans and also used in industries that utilize rollers for graphics, conveying, laminating or spreading a coating on another surface. The roller includes a core that has at least one male dovetail projection formed thereon and a sleeve with at least one female dovetail formed on the interior surface thereof. The female dovetail is sized to receive the male dovetail therein when the sleeve is slidably received on the core.

6 Claims, 3 Drawing Sheets

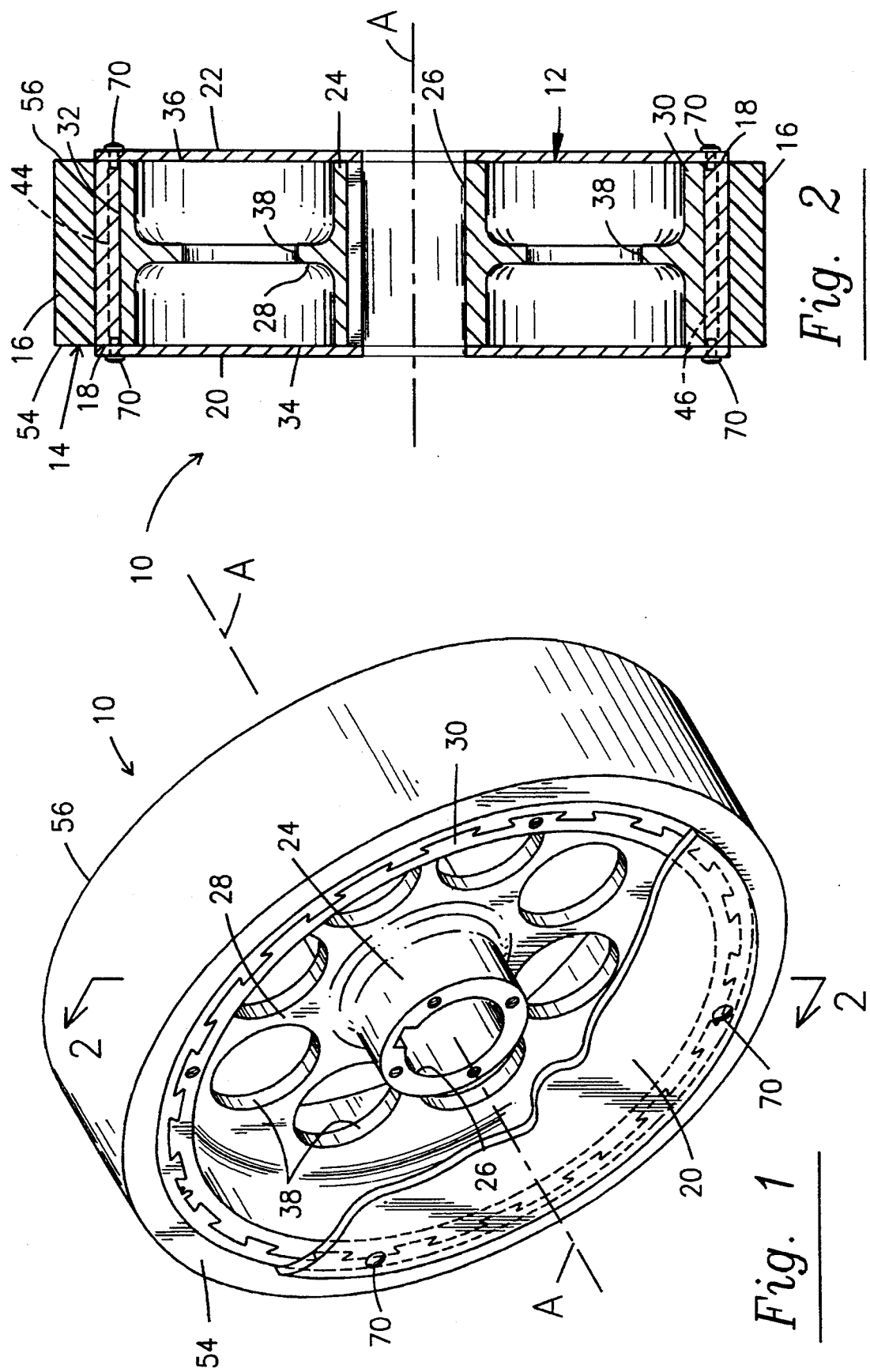

ROLLER WITH REPLACEABLE SLEEVE

BACKGROUND OF THE INVENTION

1. Field of the Invention

The present invention relates to rollers that have a sleeve that is removably mountable on the core of the roller. This invention primarily relates to those rollers that are used in the can manufacturing industry to apply a surface coating to the cans and also to the industries that utilize rollers for graphics, conveying, laminating or spreading a coating on another surface.

2. Description of the Prior Art

Rollers used in the can manufacturing industry, and other industries, usually have a cover made of soft material that must be frequently replaced due to wear. The cover is bonded to a metal core. Field replacement of the covers, the removal of an old cover and the bonding of a new cover to the existing core, was found to be too difficult and inefficient for the users to accomplish. Therefore, repairs are accomplished at a roller manufacturing plant or at repair centers established for this purpose. This requires the user to maintain in their inventory a fairly large number of rollers and to ship the worn or damaged rollers for repair. Shipping costs are high due to the weight of the metal core. Attempts have been made to reduce the cost of such repair by manufacturing a sleeve, with the outer cover bonded thereto, that is removably mountable on the metal core. A U.S. Pat. No. 3,771,206 issued to James Brown discloses a roller with a removable covered sleeve that is secured to the metal core by lugs that engage notches in the sleeve at one end of the core and a clamp mounted at the other end to hold the sleeve onto the metal core.

U.S. Pat. No. 4,178,664 issued to Nelson McLoughlin discloses a roller with a replaceable sleeve that is attached to the rollers' metal core by friction and locking nuts.

These devices may have been successful at the lower rates of manufacturing of 300–600 cans per minute that require rotation of the roller of approximately 150 to 400 rpm. However, at higher rates of manufacturing currently utilized by the can manufacturing industry, approximately 1,700–2,200 cans per minute, the rollers are rotated at approximately 400 to 600 rpm; at these speeds the sleeves do not remain concentric with the roller core causing skips in the coating being applied.

Currently the users of these rollers ship the entire roller to the manufacturer or repair center for replacement of the bonded covering. Therefore, there is still a need for a sleeve that is cheaper to ship, easy to attach in the field and one which will maintain its concentricity in relation to the core axis during the high rates of rotation currently used.

SUMMARY OF THE INVENTION

The present invention relates to a cylindrical roller that is comprised of a core with a sleeve mounted thereon. The roller core has at least one longitudinal male core dovetail formed thereon that projects outwardly from the exterior surface of the core. The sleeve has an interior surface in which at least one longitudinal female sleeve dovetail is formed in that interior surface. The female sleeve dovetail is sized and configured to receive the male core dovetail therein so that the sleeve is slidably received on the roller core.

To provide the greatest stability a plurality of male roller dovetails are formed on the exterior surface of the roller core, each being generally equally spaced from the other and distributed generally evenly around the exterior surface of the core. A corresponding number of female sleeve dovetails are formed in the interior surface of the sleeve and are spaced thereabout so that each female sleeve dovetail receives a corresponding male core dovetail therein when the sleeve is mounted on the core.

The invention, accordingly, comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with accompanying drawings, in which:

FIG. 1 is a perspective view of the roller of this invention with the end cover partially broken away.

FIG. 2 is a sectional right side view taken along line 2—2 of FIG. 1.

Similar reference characters refer to similar parts throughout the several views of the drawings.

DETAILED DESCRIPTION

Figure 4:
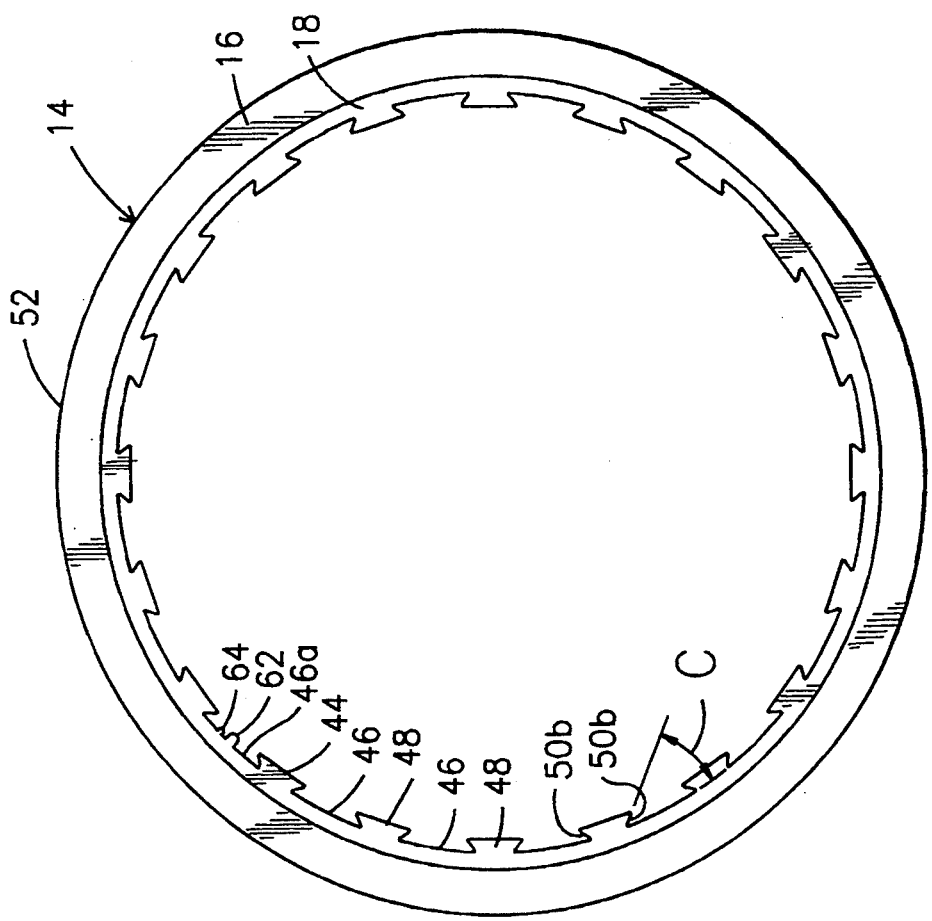
FIG. 4 is a front elevational view of the invention of FIG. 1 illustrating the sleeve portion of the roller.
Figure 3:
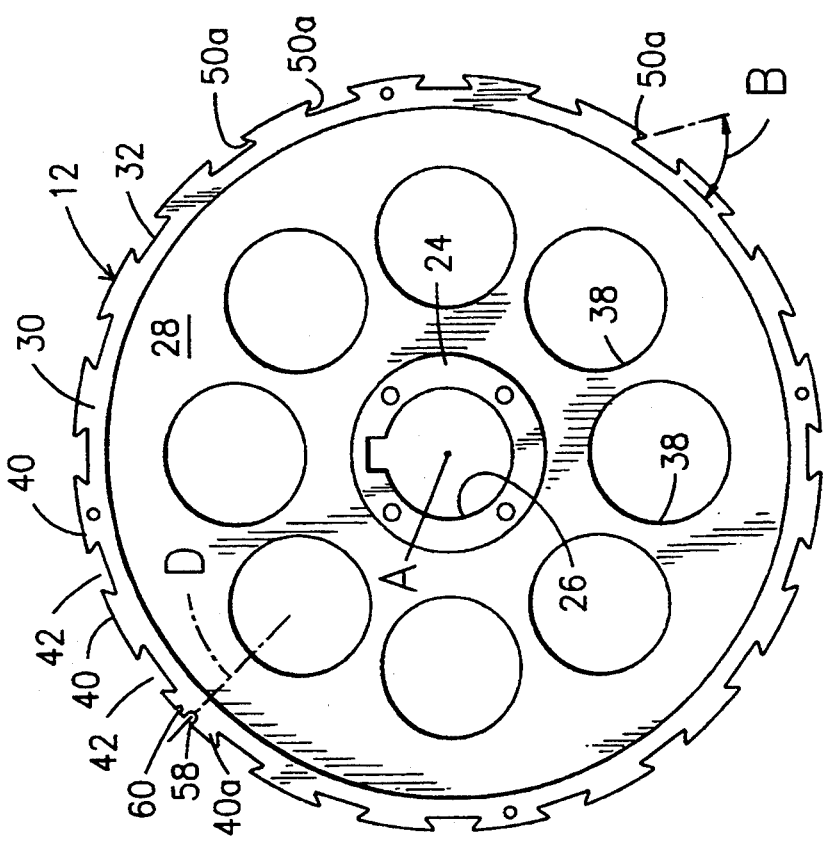
FIG. 3 is a front elevational view of the invention of FIG. 1 illustrating the core portion of the roller.
Figures 5, 6:
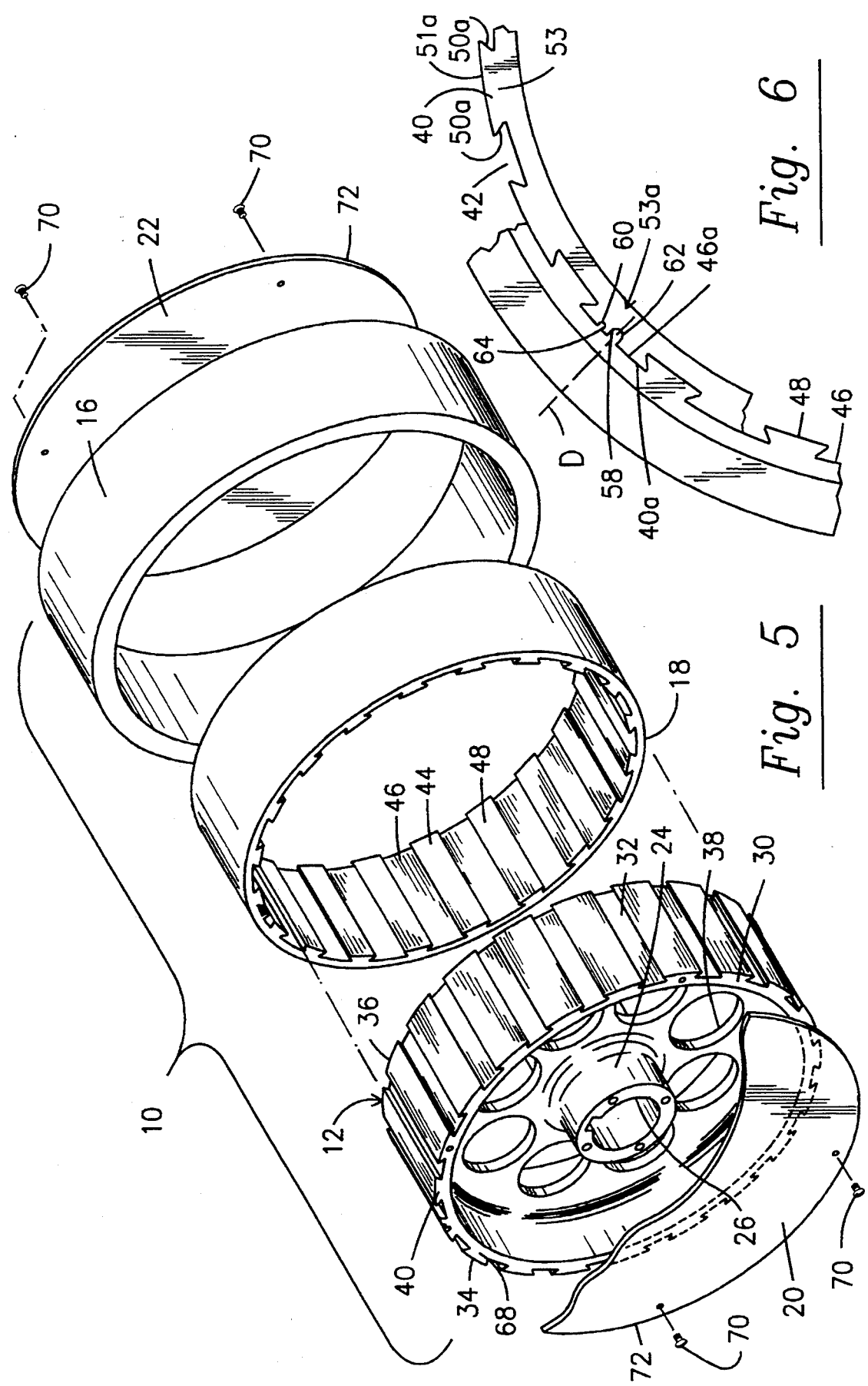
FIG. 5 is an exploded perspective view of the invention of FIG. 1.
FIG. 6 is an enlarged detailed front elevational view of a portion of the invention of FIG. 1.

A preferred embodiment of the roller of this invention is illustrated in the drawing figures and is generally indicated as ten (10) in the views of FIGS. 1, 2 and 5. Referring first to FIGS. 3 and 4, it can be seen that the roller 10 comprises a core generally indicated as 12 and a sleeve generally indicated as 14. The sleeve is comprised of an outer ring 16 and an inner ring 18. The roller 10, as best seen in FIG. 5, also comprises a first locking cover 20 and a second locking cover 22.

The roller 10 is generally cylindrical being rotatable about an axis A having a diameter and a length that is determined by the requirements of the manufacturing process being supported. The roller 10 is manufactured to various diameters and lengths as specified by the user. In a preferred embodiment illustrated in FIGS. 1–6, the core 12 comprises a hub 24 that has a bore 26 therethrough that receives and is keyed to an operating shaft (not shown) that is supported by the operating equipment (not shown) to which the roller is mounted. The core 12 further comprises a web 28 that is attached to the hub and extends outwardly therefrom to a cylindrical rim 30 that is concentric about the axis A and has an exterior surface 32. The core has a first end 34 and a second end 36. In the preferred embodiment the hub 24 has generally the same longitudinal length as the longitudinal length of the rim 30; however, in other embodiments, the hub 24 may have a longitudinal length less than the longitudinal length of the rim 30. The web 28 is relatively thin and has a plurality of holes 38 therethrough to reduce the weight of the core 12. In yet other embodiments, the web 28 may be without the holes 28 and have the same thickness as the longitudinal length of the rim 30 creating a solid core 12. The holes 38 are evenly spaced about the web 28 to maintain the even distribution of weight about the axis A to provide a balanced core 12 for smooth rotation about the axis A. The core 12, in a preferred embodiment, is comprised of aluminum for lightness and strength. However, in other embodiments the core 12 may be comprised of steel or rigid synthetic resins that are suitable for the purpose.

The exterior surface 32 of the core 12 has at least one longitudinal male core dovetail 40 formed thereon. As shown in FIGS. 1, 3, and 5, in a preferred embodiment, a plurality of core male dovetails 40 are formed on the exterior surface 32 so that they are equal in size and spaced evenly about the rim 30 of the core 12, as can be seen most clearly in FIG. 3. The space between each core dovetail 40 forms a female core dovetail 42.

The inner ring 18 of the sleeve 14 has an interior surface 44. At least one longitudinal female sleeve dovetail 46 is formed in the interior surface 44 of the inner ring 18 of the sleeve 14. In a preferred embodiment, as disclosed in FIGS. 1 through 5, a plurality of sleeve female dovetails 46 are formed on the interior surface 44. Forming the sleeve female dovetails 46 creates sleeve male dovetails 48 between each sleeve female dovetail 46.

Each sleeve female dovetail 46 is sized and configured to receive one of the core male dovetails 40 therein and the core female dovetails 42 are sized and configured to receive a corresponding sleeve male dovetail 48 therein so that the sleeve 14 is slidably received upon the core 12.

In a preferred embodiment as illustrated in FIGS. 1–6, each core male dovetail 40 is a longitudinal projection extending radially outwardly from the exterior surface 32 of the core 12. Each core male dovetail has a pair of opposing sides 50a and a top surface 51a extending therebetween. The portions of the sides 50a that are distal from the top surface 51a, extend inwardly toward one another creating a narrowed portion 53a in the male dovetail 40 where the core male dovetail 40 joins the exterior surface 32. Each core male dovetail 40 is sized and configured to be generally identical with one another with the sides 50a generally equal to one another. As seen most clearly in FIG. 3, the angle B that the sides 50a of the core male dovetail 40 form with the exterior surface 32 is generally equal to 45 degrees; however, any angle may be used that is less than 90 degrees and maintains the necessary strength and maintains the tight tolerances between the core 12 and the inner ring 14.

Each sleeve male dovetail 48 is also a longitudinal projection having a pair of opposing sides 50b and a top surface 51b. The sleeve male dovetail 48 is formed in a similar fashion as the core male dovetail 40, but they are formed on the inner ring 18 of sleeve 14 and extend radially inwardly. The angle C, as seen in FIG. 4, between the sides 50b of the sleeve male dovetail 48 and the inner ring 18 is always generally equal to angle B of the sides 50a of the core male dovetail 40.

The core 12 is cast and machined from aluminum to identically match a standard configuration. The inner ring 18 is molded directly to a master core 12. The inner ring 18 is molded from polyurethane or other suitable polymers that are preferably capable of maintaining a hardness measured on the Shore A Durometer Hardness Scale of approximately 95. By molding each inner ring 18 to a master core 12, tight tolerances are maintained and as the male and female dovetails interlock with one another, the outer surface 52 of the outer ring 16 maintains its concentricity about the axis A.

The outer ring 16, of the sleeve 14 is comprised of a soft polyurethane generally having a Shore A Durometer Rating between approximately 40 and 60 depending upon the use planned for the particular roller being manufactured. The outer ring 16 for rollers used by the can industry are generally specified to be within the 40 to 60 Durometer Rating. This outer ring 16 is bonded to the outer surface 52 of the inner ring 18 with a bonding agent such as CHEMLOC 218 ®, or any other equivalent well known in the industry.

To assure consistency in the installation of the sleeve 14, an alignment means is formed in the roller 10 so that the sleeve may be mounted on the core 12 in only one direction and only with a specific core male dovetail 40a being received by a specific sleeve female dovetail 46a. By ensuring that the sleeve may be mounted in only one direction, the first end 54 of the sleeve 14 will always be adjacent to the first end 34 of the core 12 and the second end 56 of sleeve 14 will always be adjacent to the second end 36 of core 12 when the sleeve 14 is mounted upon the core 12. The alignment means 53 comprises a pair of longitudinal grooves 58 and 60 formed in one male dovetail and a pair of longitudinal ridges 62 and 64 formed on an adjacent female dovetail 40. In a preferred embodiment as seen in FIG. 6, the grooves are formed in the top surface 53a of one first core male dovetail 40a and the longitudinal ridges are formed on a corresponding portion on one sleeve female dovetail 46a. Obviously, the grooves 58 and 60 may be formed in any male or female dovetail on either the sleeve 14 or the core 12. The grooves 58 and 60 must not be formed in the core male dovetail 40a symmetrically about a center line D or the sleeve 14 will be mountable from either end. As shown in FIGS. 3, 4 and 6 the groove 58 is larger than the groove 60 and thus the ridge 62 is larger than the ridge 64 as ridge 62 must be received by groove 58 and ridge 64 must be received by groove 60. The grooves being of different depths will prevent any possibility for the sleeve 14 to be reversed when mounted upon the core 12 whether the grooves 58 and 60 are symmetrically placed about the axis D or not.

As seen in FIG. 5, a first locking cover 20 is attached to the first edge 68 of rim 30 by a plurality of fastening means, conveniently screws 70. At least a portion of the peripheral edge 72 of locking cover 22 extends outwardly from the core 12 beyond the exterior surface 32 of the core 12 so that the peripheral edge 72 engages the first end 54 of sleeve 14 preventing the sleeve from disengaging from the first end 34 of the core 12, as best seen in FIG. 5. In similar fashion, a second locking cover 22 is attached to the second end 36 of the core 12 to prevent the sleeve 14 from disengaging from the second end 36 of core 12. In a preferred embodiment, the diameter of the locking covers 20 and 22 are equal to the diameter of the inner ring 18.

Having thus set forth a preferred construction for the roller 10 of this invention, it is to be remembered that this is but a preferred embodiment. Attention is now invited to a description of the use of roller 10. The core 12 is manufactured to close tolerances so that each core 12 is almost identical to every other core 12. The sleeves 14 are molded to a standard master core 12 and thus are interchangeable with any other sleeve 14 and may be attached to any core 12. Therefore, when the rollers are mounted on production equipment and a failure of the outer surface 52 of outer ring 16 of the sleeve 14 occurs a new sleeve 14 may be mounted on the existing core 12. This avoids the necessity of having to ship the heavy roller 10 to a manufacturing plant for replacement of the outer ring 16, avoiding the two-way shipment costs of the heavy roller 10. The sleeves 14 are manufactured from a polyurethane, or other material suitable for the purpose, and are generally thin and light weight. Thus new sleeves 14 are less costly to ship one way than shipping the roller 10 two ways. Replacement of the sleeves instead of replacement of the complete roller also reduces the inventory costs of having to maintain large numbers of the rollers 10 (including the core 12), as storing a number of sleeves 14 is less costly. The rollers 10 may be removed from the machinery, the first locking cover 20 removed and the sleeve removed with a rubber hammer or any other suitable means. The new sleeve 14 is then mounted onto the core so that core male dovetail 40a engages the sleeve female dovetail 46a, which is mountable only in one direction. The sleeve 14 is then slid upon the core 12 and the locking cover 66 is replaced. The roller 10 may then be re-mounted upon the production equipment. It may also be possible to replace the sleeve while the roller is mounted upon the production equipment.

It will thus be seen that the object set forth above, among those made apparent from the proceeding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

Now that the invention has been described
What is claimed is:

1. A roller comprising;
   a generally cylindrical core having an exterior surface, at least one longitudinal male core dovetail formed on said exterior surface of said core; and
   a generally cylindrical sleeve having an interior surface and at least one longitudinal female sleeve dovetail formed in said interior surface of said sleeve, said sleeve and said female sleeve dovetail being sized and configured to receive said male core dovetail therein such that said sleeve is slideably received on said core.

2. A roller as in claim 1, said core further comprising a plurality of said longitudinal male core dovetails spaced about said exterior surface of said core, adjacent said male core dovetails forming longitudinal female core dovetails therebetween; and
   said sleeve further comprising a plurality of female sleeve dovetails formed in and spaced about said interior surface of said sleeve and adjacent said female dovetails forming longitudinal male sleeve dovetails therebetween, said sleeve female dovetails being sized and configured so that each said male core dovetail is received by a corresponding one of said female sleeve dovetails and each said female core dovetail receives a corresponding male sleeve dovetail such that said sleeve is slideably received on said core.

3. A roller as in claim 2, wherein said core has a first end, a second end and one of said plurality of male core dovetails, and wherein said sleeve has a first end, a second end and one of said plurality of female sleeve dovetails, said roller further comprising an alignment means formed therein, such that when said sleeve is mounted on said core said first end of said core may only be adjacent said first end of said sleeve and said one male core dovetail may only be received by said one female sleeve dovetail.

4. A roller as in claim 3, wherein said alignment means comprises at least one longitudinal groove formed in said one male dovetail, said one male dovetail having a center line and said groove being spaced apart from said center line; and at least one longitudinal ridge formed on said one female dovetail such that said ridge is received by said groove when said sleeve is mounted on said core.

5. A roller as in claim 3, wherein said alignment means comprises a pair of longitudinal grooves formed in said one male dovetail one of said pair of grooves having a cross-sectional area greater than the other and a pair of longitudinal ridges formed on said one female dovetail, said ridges being sized and configured to be received by a corresponding one of said grooves when said sleeve is mounted on said core.

6. A roller as in claim 1, wherein said core has a first end and a second end and said sleeve has a first end and a second end, said roller further comprising a first end locking cover attached to said first end of said core and a second end locking cover attached to said second end of said core, each said locking cover having a peripheral edge and at least a portion of said peripheral edge extending outwardly from said core beyond said exterior surface of said core such that when said sleeve is mounted on said core said first locking cover engages said first end of said sleeve and said second locking cover engages said second end of said sleeve, whereby said sleeve is locked to said core.

* * * * *